Oct. 10, 1950    V. A. KRESHECK    2,524,980
DOOR SHOCK ABSORBER
Filed June 30, 1948    2 Sheets-Sheet 1

INVENTOR.
Vladimir Anton Kresheck
BY Victor J. Evans & Co.
ATTORNEYS

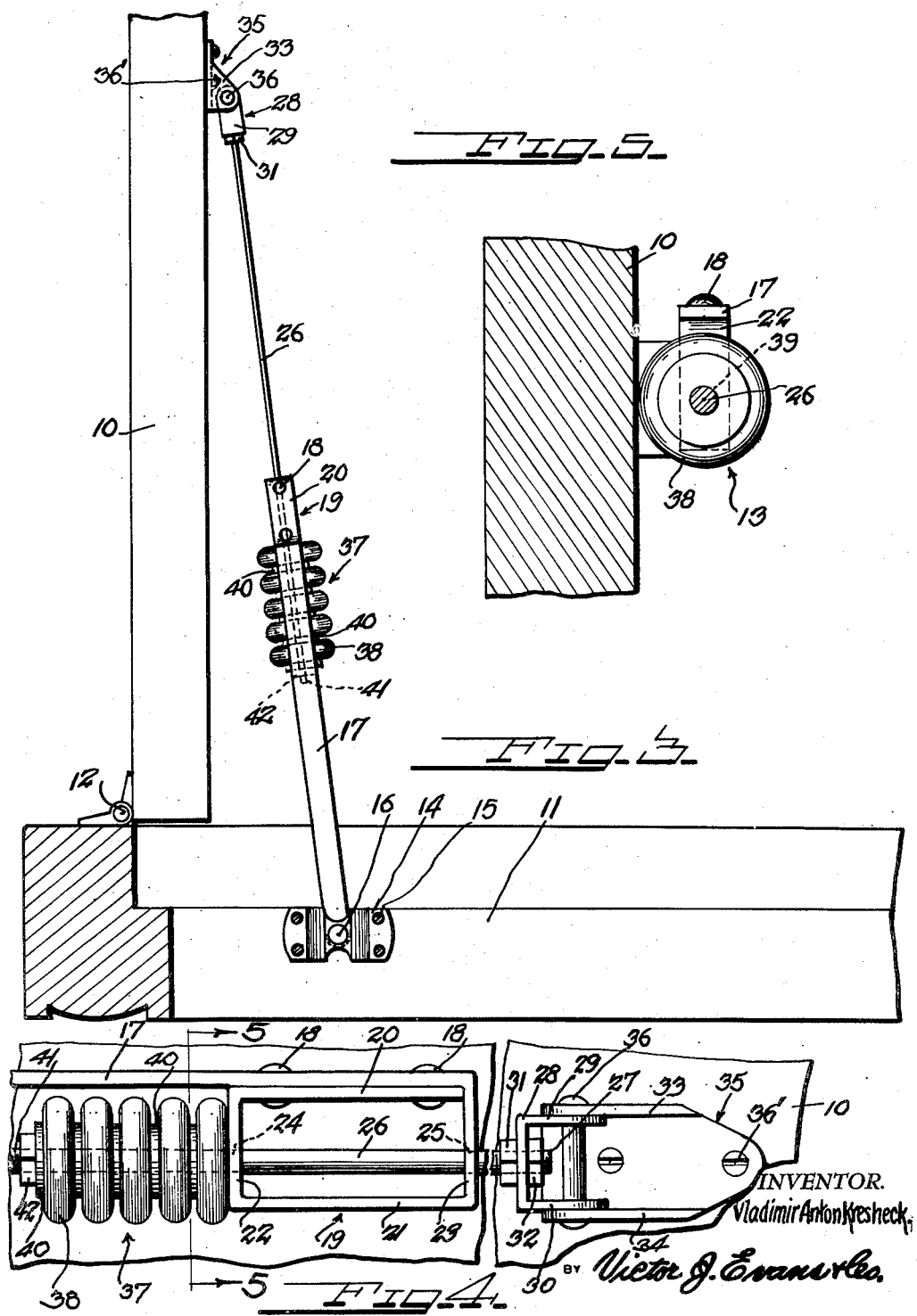

Patented Oct. 10, 1950

2,524,980

UNITED STATES PATENT OFFICE 2,524,980

DOOR SHOCK ABSORBER

Vladimir Anton Kresheck, Two Rivers, Wis.

Application June 30, 1948, Serial No. 36,152

2 Claims. (Cl. 16—86)

This invention relates to a shock absorber, and more particularly to a shock absorber for use on doors.

An object of the invention is to provide a shock absorber that will prevent injury to the door in the event the door is caught by gusts of wind and blown open violently.

Another object of the invention is to provide a shock absorber which will positively limit the opening movement of a door to a predetermined range of movement sufficiently small to avoid injury to the door.

A further object of the invention is to provide a shock absorber for offering a progressively increasing resistance to the final movement of a door in its opening direction.

A further object of the invention is to provide a shock absorber for a door which is extremely simple and inexpensive to manufacture.

Other objects and advantages will be apparent during the course of the following description.

In the accompanying drawings, forming a part of this application, and in which like numerals are employed to designate like parts throughout the same:

Figure 3 is a sectional view on an enlarged scale taken on the line 3—3 of Figure 1, with the door in open position;

Figure 4 is a fragmentary view on a still greater scale of the shock absorber attached to a door, with the door in open position, according to the present invention;

Figure 5 is a sectional view taken on the line 5—5 of Figure 4.

Figure 1:
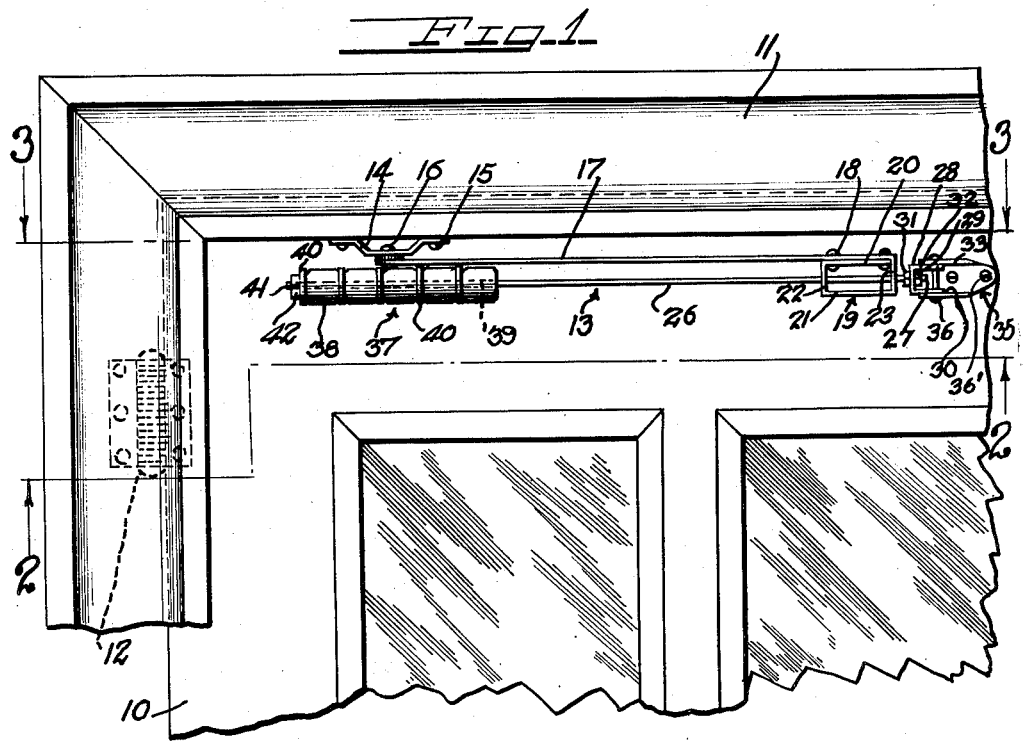
Figure 1 is a side elevational view of the shock absorber attached to a door with the door in closed position according to the present invention.
Figure 2:
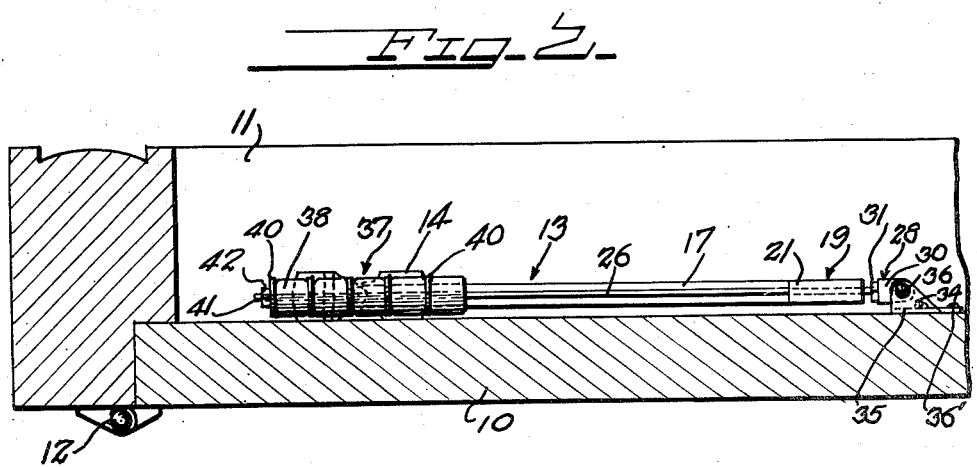
Figure 2 is a sectional view taken on the line 2—2 of Figure 1.

Referring to the drawings, the numeral 10 designates an outside storm or screen door, the door 10 being hingedly connected to a door jamb or frame 11 by means of an outside hinge 12.

The shock absorber 13 is provided for limiting opening movement of the door 10 relative to the door jamb 11, and the shock absorber 13 comprises a bracket 14 secured to the top of the door jamb 11 by means of the screws 15. Carried by the bracket 14 is a stud bolt 16. An arm 17 has one end connected to the bolt 16, thereby providing a pivotal connection between the arm 17 and bracket 14. Secured to the other end of the arm 17 by means of bolts 18 is a casing 19 having spaced parallel side walls 20 and 21 and extending between side walls 20 and 21 and secured thereto is a pair of end walls 22 and 23. The end walls 22 and 23 are each provided with aligned apertures 24 and 25, respectively, for slidably receiving the rod 26 therein.

One end of the rod 26 is threaded, as at 27, and extends through an apertured U-shaped clip 28 having depending legs 29 and 30. The rod 26 is releasably locked to the clip 28 by means of the castle nuts 31 and 32 which are threaded on the end 27 of the rod 26. The clip 28 is so arranged that its legs 29 and 30 are between the apertured flanges 33 and 34 of the bracket 35, Figures 1 and 4. Extending through the apertured flanges 33, 34, and the legs 29 and 30 is a stud bolt 36, thereby providing a pivotal connection between the rod 26 and the bracket 35. The bracket 35 is secured to the upper end of the door 10 by means of the plurality of screws 36'.

Positioned on the other end of the rod 26 is a bumper assembly 37. The bumper assembly 37 embodies a series of rubber bumper rings 38 provided with a longitudinally extending bore 39 for the reception therein of the rod 26. Arranged in spaced parallel relation between the bumper rings is a plurality of transversely disposed steel washers 40 for insuring a progressively increasing resistance to opening of the door 10 as subsequently described. The end of the rod 26 is threaded at 41 and a nut 42 is in threaded engagement with the threaded end 41 of the rod 26 for maintaining the bumper assembly 37 on the rod 26.

The operation of the device is started when the door 10 is moved away from the door frame 11 as by a sudden gust of wind. The opening of the door causes the arm 17 to pivot about the stud bolt 16 with the casing 19 being slidably moved along the rod 26 until the end wall 22 of the casing 19 strikes or abuts the inner bumper ring 38 to compress the latter and thus positively limit the opening of the door, since the bumper assembly 37 is mounted on one end of the rod 26, with the other end of the rod 26 being pivotally connected to the door 10.

In Figures 3 and 4, the rubber bumper rings 38 are shown in their compressed position, such position resulting when the door 10 is suddenly opened, and as a result of the rubber bumper rings 38 being provided with a plurality of spaced steel washers 40 therebetween, a progressively increasing resistance will be offered to the final movement of the door, thereby preventing damage to the latter.

From the foregoing description and a study of the drawings, it will be apparent that I have provided a new construction. It is, of course, to be understood that I reserve the right to make such changes in the form, construction, and arrangement of parts as will not depart from the spirit of the invention or the scope of the appended claims.

I claim:

1. In a shock absorber for a door hingedly secured to a door frame, a first bracket secured to said door frame, an arm having one end pivotally connected to said bracket, a casing carried by the other end of said arm, a rod slidably carried by said casing, a second bracket secured to said door and pivotally connected to one end of said rod, and a bumper assembly on the other end of said rod for abutting said casing when said door is moved away from said frame, said bumper assembly comprising a rubber bumper provided with a longitudinally extending bore for receiving said rod, a plurality of spaced parallel transversely disposed washers circumposed on said rod, and means for maintaining said bumper on said rod.

2. In a shock absorber for a door hingedly secured to a door frame, a first bracket secured to said door frame, an arm having one end pivotally connected to said bracket, a casing carried by the other end of said arm, a rod slidably carried by said casing, a second bracket secured to said door and pivotally connected to one end of said rod, a bumper assembly on the other end of said rod for abutting said casing when said door is moved away from said frame, said bumper assembly comprising a rubber bumper provided with a longitudinally extending bore for receiving said rod, and a plurality of spaced parallel transversely disposed washers circumposed on said rod.

VLADIMIR ANTON KRESHECK.

REFERENCES CITED

The following references are of record in the file of this patent:

UNITED STATES PATENTS

| Number | Name | Date |
|---|---|---|
| 1,858,541 | Duffy | May 17, 1932 |
| 2,219,824 | Schonitzer | Oct. 29, 1940 |